United States Patent
Iio

(10) Patent No.: US 7,476,098 B2
(45) Date of Patent: Jan. 13, 2009

(54) FUEL CELL POWER PLANT WARM UP

(75) Inventor: Masatoshi Iio, Yokosuka (JP)

(73) Assignee: Nissan Motor Co., Ltd., Kanagawa (JP)

( * ) Notice: Subject to any disclaimer, the term of this patent is extended or adjusted under 35 U.S.C. 154(b) by 422 days.

(21) Appl. No.: 10/510,480

(22) PCT Filed: Feb. 27, 2003

(86) PCT No.: PCT/JP03/02199

§ 371 (c)(1),
(2), (4) Date: Oct. 7, 2004

(87) PCT Pub. No.: WO03/085767

PCT Pub. Date: Oct. 16, 2003

(65) Prior Publication Data

US 2005/0227129 A1 Oct. 13, 2005

(30) Foreign Application Priority Data

Apr. 9, 2002 (JP) .............................. 2002-106235

(51) Int. Cl.
*F23N 5/20* (2006.01)
*H01M 8/04* (2006.01)

(52) U.S. Cl. .................... 431/6; 431/11; 431/328; 429/20; 429/24; 429/26; 422/198

(58) Field of Classification Search .................. 431/6, 431/7, 11, 326, 328; 429/20, 26, 24; 422/198
See application file for complete search history.

(56) References Cited

U.S. PATENT DOCUMENTS

| 6,033,793 | A   | * | 3/2000  | Woods et al. ............. 429/17 |
| 6,294,149 | B1  |   | 9/2001  | Autenrieth et al. |
| 6,331,366 | B1  |   | 12/2001 | Van Dine et al. |
| 6,641,944 | B2  | * | 11/2003 | Kawasumi et al. ........ 429/19 |
| 2001/0016275 | A1 |   | 8/2001  | Takamura |
| 2002/0004021 | A1 | * | 1/2002  | Tachihara et al. .......... 422/182 |
| 2005/0089732 | A1 | * | 4/2005  | Aoyama et al. ............ 429/20 |

FOREIGN PATENT DOCUMENTS

| EP | 1 198 020 A2 | 4/2002 |
| EP | 1 248 312 A2 | 10/2002 |
| JP | 5-303970     | 11/1993 |
| JP | 9-245825     | 9/1997 |

* cited by examiner

*Primary Examiner*—Alfred Basichas
(74) *Attorney, Agent, or Firm*—McDermott Will & Emery LLP

(57) ABSTRACT

In a fuel cell power plant, carbon monoxide contained in reformate gas which is produced by a reformer (3) by means of a catalytic fuel reaction is removed by the respective catalytic reactions of a shift converter (4) and a preferential oxidation reactor (5). During start up of the fuel cell power plant, a burner (6) burns fuel to produce combustion gas and the combustion gas is supplied individually to the reformer (3), shift converter (4) and preferential oxidation reactor (5) through combustion gas supply passages (71-73) thereby simultaneously completing warming up of these catalytic reactors (3-5).

7 Claims, 9 Drawing Sheets

FUEL CELL POWER PLANT WARM UP

FIELD OF THE INVENTION

This invention relates to the warming up of a fuel cell power plant using reformate gas.

BACKGROUND OF THE INVENTION

In a fuel cell power plant in which the hydrogen required by a fuel cell stack is obtained by fuel reforming, catalysts are used in reactors such as a reformer and a carbon monoxide removal device. It is therefore necessary to warm up each reactor upon start up of the fuel cell power plant so that these catalysts reach activation temperature. In relation thereto, JP05-303970, published by the Japanese Patent Office in 1993, discloses a warm up device for warming up a reformer and carbon monoxide removal device using a single burner.

In this warm up device, fuel combustion is performed by the burner and the reformer is warmed up using the heat generated upon combustion. Combustion gas is then led to the carbon monoxide removal device, whereupon the carbon monoxide removal device is warmed up using the heat of the combustion gas.

SUMMARY OF THE INVENTION

When this warm up device is used, however, the burner first warms up the reformer using the heat generated by fuel combustion, and thus the temperature of the combustion gas does not rise sufficiently until warming up of the reformer is complete. As a result, a commensurate time difference occurs between the completion of reformer warm up and the completion of carbon monoxide removal device warm up using combustion gas heat. This time difference is responsible for lengthening the time required for warming up the fuel cell power plant.

It is therefore an object of this invention to reduce the amount of time required for warming up an entire fuel cell power plant by eliminating discrepancies in the amount of time required to warm up each reactor which uses a catalyst.

It is a further object of this invention is to reduce the amount of energy expended in the warming up of reactors using catalysts.

In order to achieve the above objects, this invention provides a warm up device for a catalytic reactor for use with a fuel cell power plant which comprises a plurality of catalytic reactors each of which contains a catalyst, and a gas passage for connecting the catalytic reactors in series. The warm up device comprises a burner for producing combustion gas by burning fuel in order to warm the catalysts upon start up of the fuel cell power plant, and combustion gas supply passages for distributing the combustion gas individually to the catalytic reactors.

The details as well as other features and advantages of this invention are set forth in the remainder of the specification and are shown in the accompanying drawings.

DESCRIPTION OF THE PREFERRED EMBODIMENTS

Figure 1:
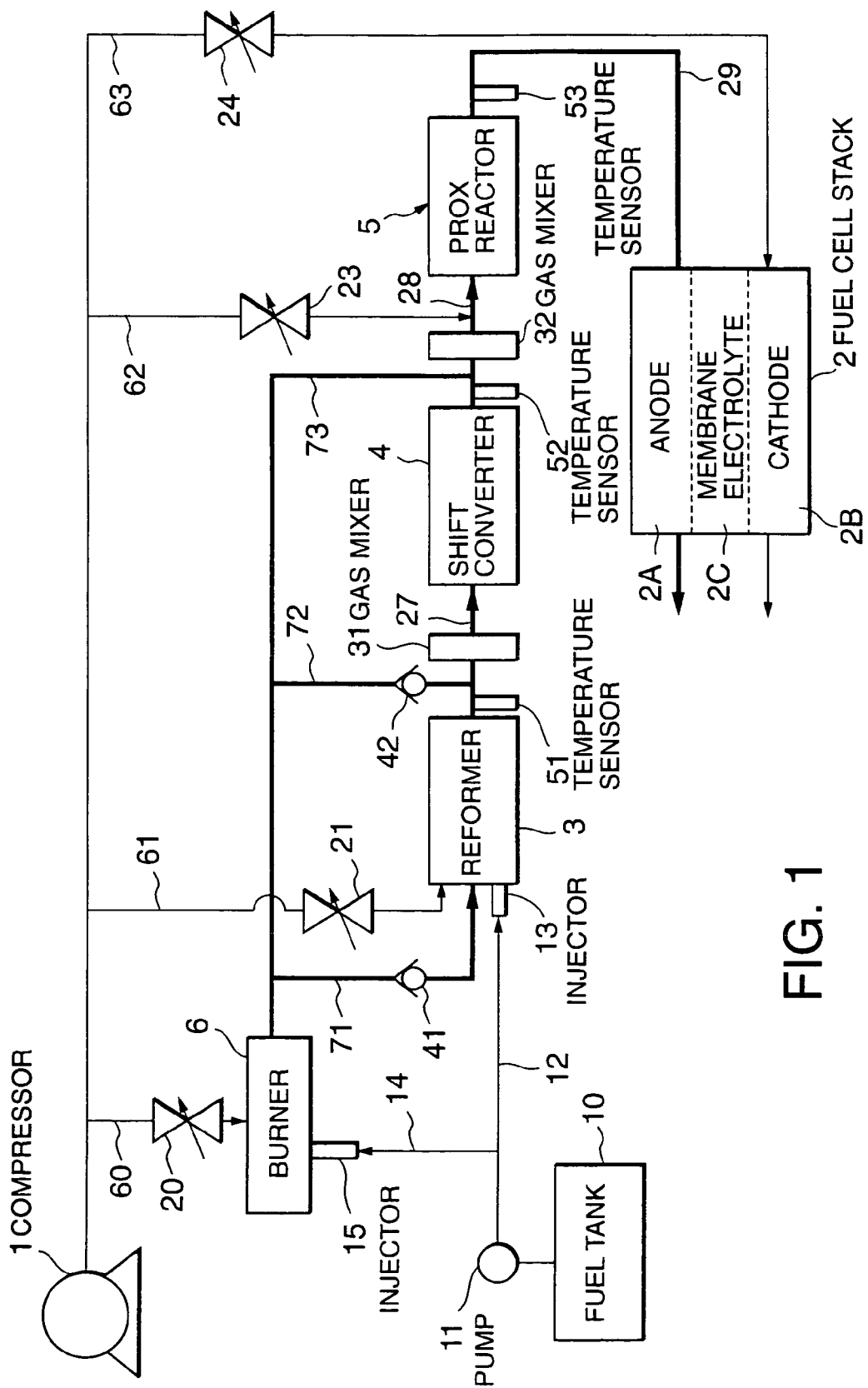
FIG. 1 is a schematic diagram of a fuel cell power plant provided with a reforming system warm up device according to this invention.

Referring to FIG. 1 of the drawings, a fuel cell power plant for use in a vehicle comprises a reforming system for reforming hydrocarbon fuel such as gasoline or ethanol to produce hydrogen rich gas, and a fuel cell stack 2 for performing power generation using hydrogen rich gas and oxygen.

The reforming system is constituted by a reformer 3, a shift converter 4, and a preferential oxidation reactor (PROX reactor) 5, which are connected in series via reformate gas passages 27 and 28.

Hydrocarbon fuel from a fuel tank 10 which is pressurized by a pump 11 is supplied to the reformer 3 via a fuel passage 12. The supplied fuel is injected into the interior of the reformer 3 by an injector 13. The reformer 3 is also supplied with air from a compressor 1 via an air passage 61 comprising an air supply valve 21. The reformer 3 reforms the mixture of air and hydrocarbon fuel using a known catalyst mediated reforming method such as steam reforming, partial oxidation, or autothermal reforming to thereby produce reformate gas having hydrogen as the main component thereof.

The shift converter 4 reacts carbon monoxide (CO) contained in the reformate gas with water vapor using a catalyst to convert the carbon monoxide into carbon dioxide ($CO_2$), thereby reducing the CO concentration in the reformate gas.

The PROX reactor 5 reacts the carbon monoxide (CO) contained in the reformate gas with oxygen ($O_2$) in air using a catalyst to convert the carbon monoxide into carbon dioxide ($CO_2$), thereby reducing the CO concentration in the reformate gas. For this purpose, the PROX reactor 5 is supplied with air from the compressor 1 via an air passage 62 which comprises an air supply valve 23.

The fuel cell stack 2 is constituted by a stacked body of fuel cells. Each fuel cell comprises an anode 2A, a cathode 2B, and a membrane electrolyte 2C therebetween. The fuel cell separates the hydrogen supplied to the anode 2A from the PROX reactor 5 via a reformate gas passage 29 into a proton ($H^+$) and an electron (e) by means of an oxidation reaction using a catalyst. The proton ($H^+$) permeates the membrane electrolyte 2C to reach the cathode 2B.

A load such as an electric motor is connected to the anode 2A and cathode 2B via an electrical circuit. The electron drives the load and reaches the cathode 2B via the electrical circuit. The cathode 2B is supplied with air from the compressor 1 via an air passage 63 which comprises an air supply valve 24 such that the proton ($H^+$) having permeated the membrane electrolyte 2C and the electron (e) having passed through the load react with the oxygen in the air using a catalyst to produce water. The fuel cell stack 2 illustrated in the drawing is depicted as a single fuel cell for explanatory purposes, but in actuality the fuel cell stack 2 is constituted by a stacked body of fuel cells, as was noted above.

Anode effluent from the anode 2A and cathode effluent from the cathode 2B are discharged upon power generation.

As described above, all of the fuel cell stack 2, reformer 3, shift converter 4, and PROX reactor 5 are units which perform reactions using catalysts, and in the following description, these units will be referred to generically as catalytic reactors.

When power generation is performed by the fuel cell power plant according to the above process, the catalysts of these catalytic reactors have to have reached their activation temperatures. For this purpose, each catalytic reactor must be warmed prior to the start of power generation in the fuel cell power plant. This preparatory operation up to the beginning of power generation, including warm up, will be referred to as fuel cell power plant start up.

The fuel cell power plant is provided with a warm up device which is constituted by a burner 6 for warming up the catalytic reactors 3-5 during start up and combustion gas supply passages 71 to 73.

The burner 6 is supplied with hydrocarbon fuel from a fuel passage 14 which is separated from the fuel passage 12. The burner 6 is also supplied with air from the compressor 1 via an air passage 60 which comprises an air supply valve 20. The burner 6 uses the injector 15 to inject fuel toward the air and burns the air-fuel mixture produced as a result to produce combustion gas.

The temperature of the combustion gas must not exceed the heat resistant temperature of the catalyst in each of the catalytic reactors. Further, since the combustion gas is released into the atmosphere following warming up of the catalytic reactors 3-5 the carbon monoxide contained in the combustion gas must be suppressed to as low a level as possible. In order to satisfy such requirements, the air supply amount and fuel injection amount in the burner 6 are controlled such that the ratio of air supply amount and fuel injection amount exceeds the stoichiometric air fuel ratio. In other words, the burner 6 produces combustion gas by lean burn.

The combustion gas produced in this manner is supplied to the combustion gas passages 71-73 which are connected in parallel to the burner 6. The combustion gas passage 71 supplies combustion gas to the reformer 3 via a check valve 41. The combustion gas which is supplied to the reformer 3 is warmed by the reformer 3 and then discharged to the reformate gas passage 27.

The combustion gas passage 72 converges with the reformate gas passage 27 via a check valve 42. A gas mixer 31 for mixing the combustion gas from the reformer 3 and the high temperature combustion gas in the combustion gas passage 72 is provided downstream of the point of convergence on the reformate gas passage 27.

The combustion gas mixed in the gas mixer 31 flows into the shift converter 4 from the reformate gas passage 27, and having warmed the shift converter 4, flows out into the reformate gas passage 28. The combustion gas passage 73 converges with the reformate gas passage 28.

A gas mixer 32 for mixing the combustion gas from the shift converter 4 and the high temperature combustion gas in the combustion gas passage 73 is provided downstream of the point of convergence on the reformate gas passage 28.

The combustion gas mixed by the gas mixer 32 flows into the PROX reactor 5 from the reformate gas passage 29, and having warmed the PROX reactor 5, is released into the atmosphere from the reformate gas passage 29 through the anode 2A of the fuel cell stack 2. As noted above, the burner 6 performs lean burn to produce combustion gas with a low CO concentration, and thus, after warming the reforming system, the combustion gas may be directly released into the atmosphere in this manner.

Note that during the warming up of the catalytic reactors 3-5 the air supply valves 21 and 22 of the air supply passages 61 and 62 are both closed such that combustion gas alone is supplied to the catalytic reactors 3-5.

The check valves 41 and 42 of the combustion gas passages 71 and 72 play the following role. When the fuel cell power plant is operating normally, the reformate gas from the reformer 3 is supplied to the anode 2A of the fuel cell stack 2 via the reformate gas passage 27, shift converter 4, reformate gas passage 28, PROX reactor 5, and reformate gas passage 29.

During this process, the pressure of the reformate gas gradually increases toward the catalytic reactors on the upstream side. Here, the combustion gas passage 71, the combustion gas passage 72, and the combustion gas passage 73 are respectively connected to the reformer 3, the reformate gas passage 27, and the reformate gas passage 28 at all times. When the fuel cell power plant is operating normally, the burner 6 does not perform combustion and the combustion gas passages 71-73 are at low pressure.

Under these conditions, the reformate gas produced by the reformer 3 may flow into the reformate gas passage 28 from the combustion gas passage 71 via the combustion gas passage 73, and the reformate gas which flows into the reformate gas passage 27 from the reformer 3 may flow out into the reformate gas passage 28 from the combustion gas passage 72 via the combustion gas passage 73.

Since all of these flows of reformate gas bypass the shift converter 4 to reach the reformate gas passage 28, carbon monoxide removal is not performed on these reformate gas flows by the shift converter 4. The check valves 41 and 42 perform the role of preventing such undesirable flows of reformate gas which may be formed in the combustion gas passages 71-73. Upon start up of the fuel cell power plant the catalytic reactors 3-5 must be warmed up, but by distributing the combustion gas produced by the burner 6 among the catalytic reactors 3-5 through the supply passages 71-73, disparities in the amount of time necessary for warming up the catalytic reactors 3-5 can be eliminated.

In order to reduce start up time, it is desirable for warm up of the catalytic reactors 3-5 to end simultaneously. This is achievable by appropriately setting the flow ratio of the combustion gas passages 71-73 or in other words the flow through cross section ratio of the combustion gas passages 71-73. A setting method for doing so will be described below.

First, a target temperature necessary for each of the catalytic reactors 3-5 to achieve a conversion rate required for operating the fuel cell power plant is set. The target temperature is a temperature at which the catalysts of the catalytic reactors 3-5 reach a predetermined state of activation. The target temperature differs among the catalytic reactors 3-5, but when the catalytic reactors 3-5 respectively reach their target temperature, the reforming system becomes able to supply the hydrogen rich gas that is necessary to begin operations in the fuel cell stack 2.

Here, if the catalyst temperature of the reformer 3, the catalyst temperature of the shift converter 4, and the catalyst temperature of the PROX reactor 5 are respectively set as $Trp$, $Tsp$, and $Tcp$ when the fuel cell power plant is operating normally, the relationship $Trp > Tsp > Tcp$ is generally established. That is, when the fuel cell power plant is operating normally, the catalyst temperature gradually increases toward the units on the upstream side of the reformate gas flow. The respective target temperatures of the catalytic reactors 3-5 are likewise set gradually higher toward the units on the upstream side.

Figure 3:
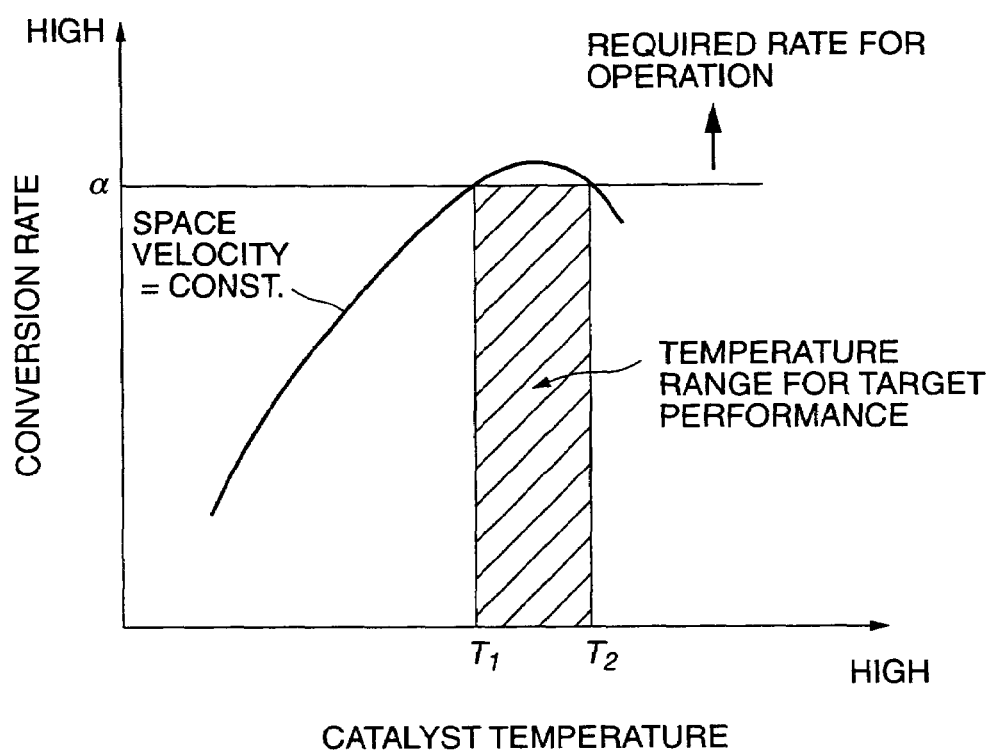
FIG. 3 is a diagram illustrating the relationship between the catalyst temperature and conversion rate of each reactor in the reforming system.

Referring to FIG. 3, a conversion rate a of the catalytic reactor 3 which is required to operate the fuel cell power plant is achieved between $T_1$ and $T_2$ of the catalyst temperature. The target temperature is therefore set to a temperature within this region. Similar maps are used for the other catalytic reactors 4, 5 to set the respective target temperatures thereof. This region will be referred to as the catalytic reactor operating temperature. Typically, the operating temperature of the reformer 3 is 600 to 800 degrees centigrade, the operating temperature of the shift converter 4 is 200 to 400 degrees centigrade, and the operating temperature of the PROX reactor 5 is 100 to 200 degrees centigrade.

The heat amount required for warming the catalytic reactors 3-5 to their respective target temperatures may be determined using the following expression (1).

$$\text{Required heat amount} = \text{thermal capacity of reactor} \cdot (\text{target temperature} - \text{initial temperature}) \quad (1)$$

Here, the thermal capacity of the reactor is a fixed value unique to each catalytic reactor 3-5. The initial temperature is the catalyst temperature of each catalytic reactor 3-5 at the point in time when warm up begins. In this case, the initial temperature is provided as a set initial temperature by means of a fixed value, for example, twenty degrees centigrade (20° C.).

The supply of the heat amount to each catalytic reactor 3-5 is provided in all cases by combustion gas supplied from the burner 6. If a set warm up time is assumed to be Ti, and if the target heat amount supply to each catalytic reactor 3-5 is completed upon the elapse of the set warm up time Ti from the beginning of warm up, then the catalytic reactors 3-5 achieve the conversion rate required to operate the fuel cell power plant simultaneously.

The heat amount absorbed by the catalytic reactors 3-5 during the period from the beginning of start up to the end of the set warm up time Ti is expressed in the following expression (2).

$$\text{Heat amount} = \int_o^{Ti} \{\text{specific heat of combustion gas} \cdot \text{flow rate} \cdot \text{temperature difference between combustion gas at inlet and outlet of reactor}(t)\} \cdot dt \quad (2)$$

where, t=time elapsed from the beginning of warm up.

If the temperature of the combustion gas produced in the burner 6 is assumed to be T, then combustion gas at temperature T is directly supplied from the burner 6 via the combustion gas passage 71 to the reformer 3 which is positioned furthest upstream of the catalytic reactors 3-5 as regards the flow of combustion gas.

The amount of heat transfer to the reformer 3 may be calculated in advance from the heating surface area and the thermal conductivity of the reformer 3. If the amount of heat transfer to the reformer 3 is known, the difference in temperature between the combustion gas at the inlet and outlet of the reformer 3 may be expressed as a function f1(t) of the time elapsed t from the beginning of warm up.

Alternatively, by providing a temperature sensor 51 at the outlet of the reformer 3 and monitoring the temperature Ta(t) detected by the temperature sensor 51 when combustion gas at temperature T is supplied to the reformer 3, the temperature difference between the combustion gas at the inlet and the outlet of the reformer 3 may be expressed as a function T−Ta(t) of the time elapsed t from the beginning of warm up. If the function f1(t) or the function T−Ta(t) and the specific heat and flow rate Qa of the combustion gas, which are fixed values, are substituted into expression (2), the amount of heat absorbed by the reformer 3 during the time period from the beginning of start up to the end of the set warm up time Ti may be calculated.

The combustion gas supply flow rate Qa of the combustion gas passage 71 is determined such that the heat amount calculated in expression (2) satisfies the required heat amount calculated in expression (1).

The combustion gas supplied to the shift converter 4 is a mixed gas produced by mixing in the gas mixer 31 combustion gas which flows out from the reformer 3 into the reformate gas passage 27 and combustion gas at temperature T supplied from the combustion gas passage 72.

The temperature of the combustion gas which flows out from the reformer 3 into the reformate gas passage 27 is equal to the temperature Ta(t) detected by the temperature sensor 51, and the flow rate thereof is equal to the combustion gas supply flow rate Qa of the combustion gas passage 71. If the flow rate of the combustion gas supplied from the combustion gas passage 72 is set as Qb, and Qa, Qb are both assumed to be constant values, then the temperature of the combustion gas that is supplied to the shift converter 4 is provided as a function of the time elapsed t from the beginning of warm up.

The amount of heat transfer to the shift converter 4 may be calculated in advance from the heating surface area and thermal conductivity of the shift converter 4. Thus, from the amount of heat transfer to the shift converter 4 and by providing the temperature of the combustion gas supplied to the shift converter 4 as a function of the time elapsed t from the beginning of warm up, the temperature difference between the combustion gas at the inlet and the outlet of the shift converter 4 can be expressed as a function of the time elapsed t from the beginning of warm up.

However it is also possible to determine the temperature difference between the combustion gas at the inlet and outlet of the shift converter 4 experientially.

Specifically, a temperature sensor 52 is provided at the outlet of the shift converter 4, and with the shift converter 4 connected to the reformer 3 and the combustion gas passage 72, the temperature Tb(t) detected by the temperature sensor 52 is monitored while combustion gas is supplied to the reformer 3 at the flow rate Qa, and combustion gas is supplied to the combustion gas passage 72 at the flow rate Qb.

In so doing, the temperature difference between the combustion gas at the inlet and the outlet of the shift converter 4 can be expressed as a function f2(t) of the time elapsed t from the beginning of warm up. If the function f2(t) and the specific heat and flow rate Qa+Qb of the combustion gas, which are constant values, are substituted into expression (2), the amount of heat absorbed by the shift converter 4 during the time period from the beginning of start up to the end of the set warm up time Ti may be calculated.

The combustion gas supply flow rate Qb of the combustion gas passage 72 is determined such that the heat amount calculated in expression (2) satisfies the required heat amount calculated in expression (1).

The temperature difference between the combustion gas at the inlet and outlet of the PROX reactor 5, which is positioned furthest downstream, is determined as a function f3(t) of the time elapsed t from the beginning of warm up using a similar procedure as that used to determined the temperature difference between the combustion gas at the inlet and outlet of the shift converter 4, that is by providing a temperature sensor 53 at the outlet of the PROX reactor 5 and monitoring the temperature Tc(t) detected thereby, for example.

If the combustion gas supply flow rate in the combustion gas passage 73 is set as Qc and the function f3(t) and the specific heat and flow rate Qa+Qb+Qc, which are constant values, are substituted into expression (2), the amount of heat absorbed by the PROX reactor 5 during the time period from the beginning of start up to the end of the set warm up time Ti can be calculated. The combustion gas supply flow rate Qc of the combustion gas passage 73 is determined such that the heat amount calculated in expression (2) satisfies the required heat amount calculated in expression (1).

The flow rates of the fuel and air supplied to the burner 6 during start up are determined such that combustion gas at temperature T may be supplied by the burner 6 at a flow rate which is equal to or greater than the total value of the combustion gas supply flow rates Qa, Qb, Qc calculated in the aforementioned manner.

Further, the flow through cross sections of the combustion gas passages 71-73 are determined such that the combustion gas produced by the burner 6 is distributed among the combustion gas passages 71-73 at a ratio of Qa:Qb:Qc. The cross sectional dimensions of the piping which constitutes the combustion gas passages 71-73 are determined in accordance with the determined flow through cross sections. Alternatively, the above distribution ratio may be realized by providing valves in the combustion gas passages 71-73 and setting the degree of opening of the valves.

Figure 4:
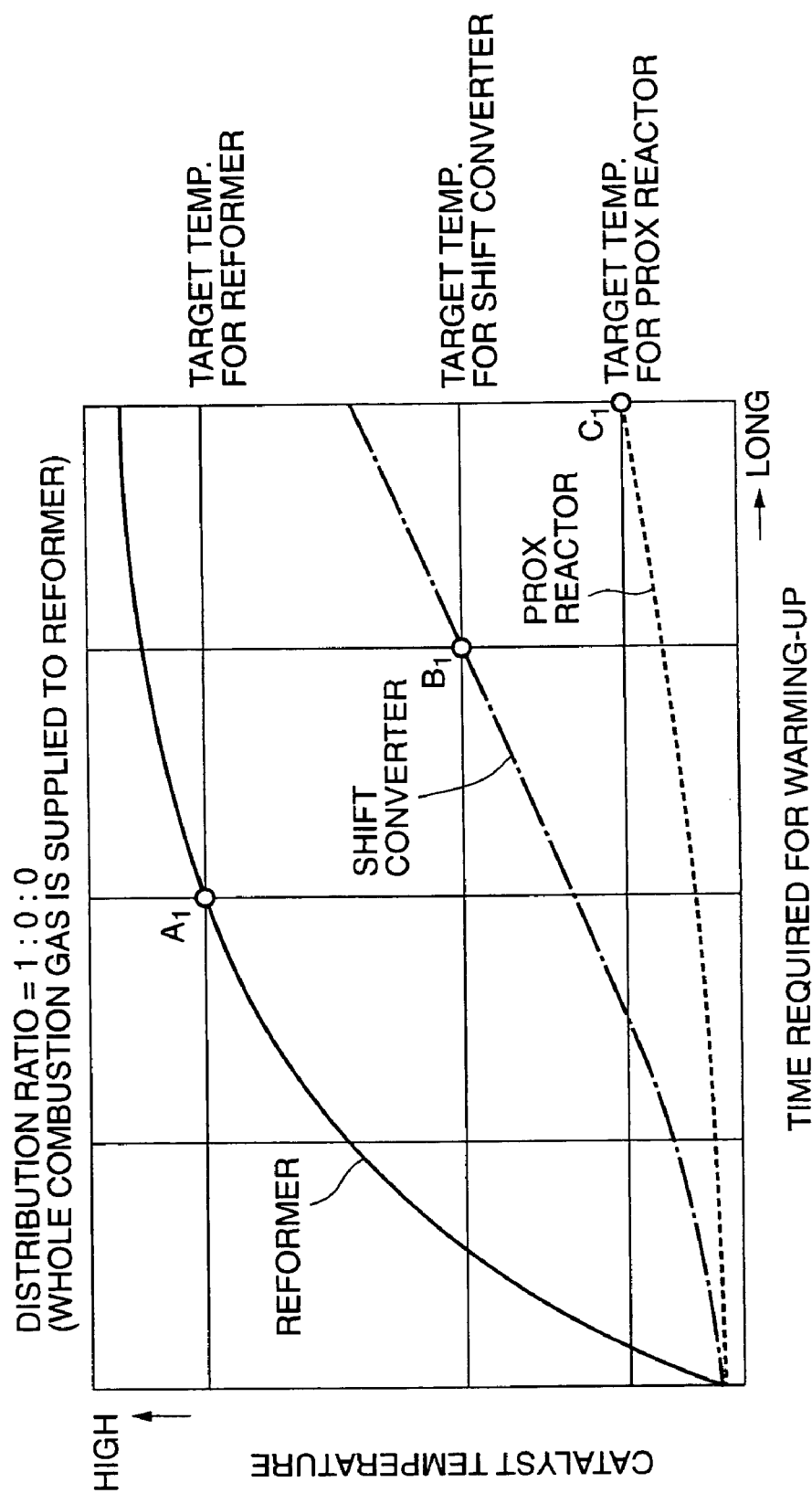
FIG. 4 is a diagram illustrating the relationship between the warm up time and temperature of each reactor when combustion gas is supplied only to a reformer.
Figure 5:
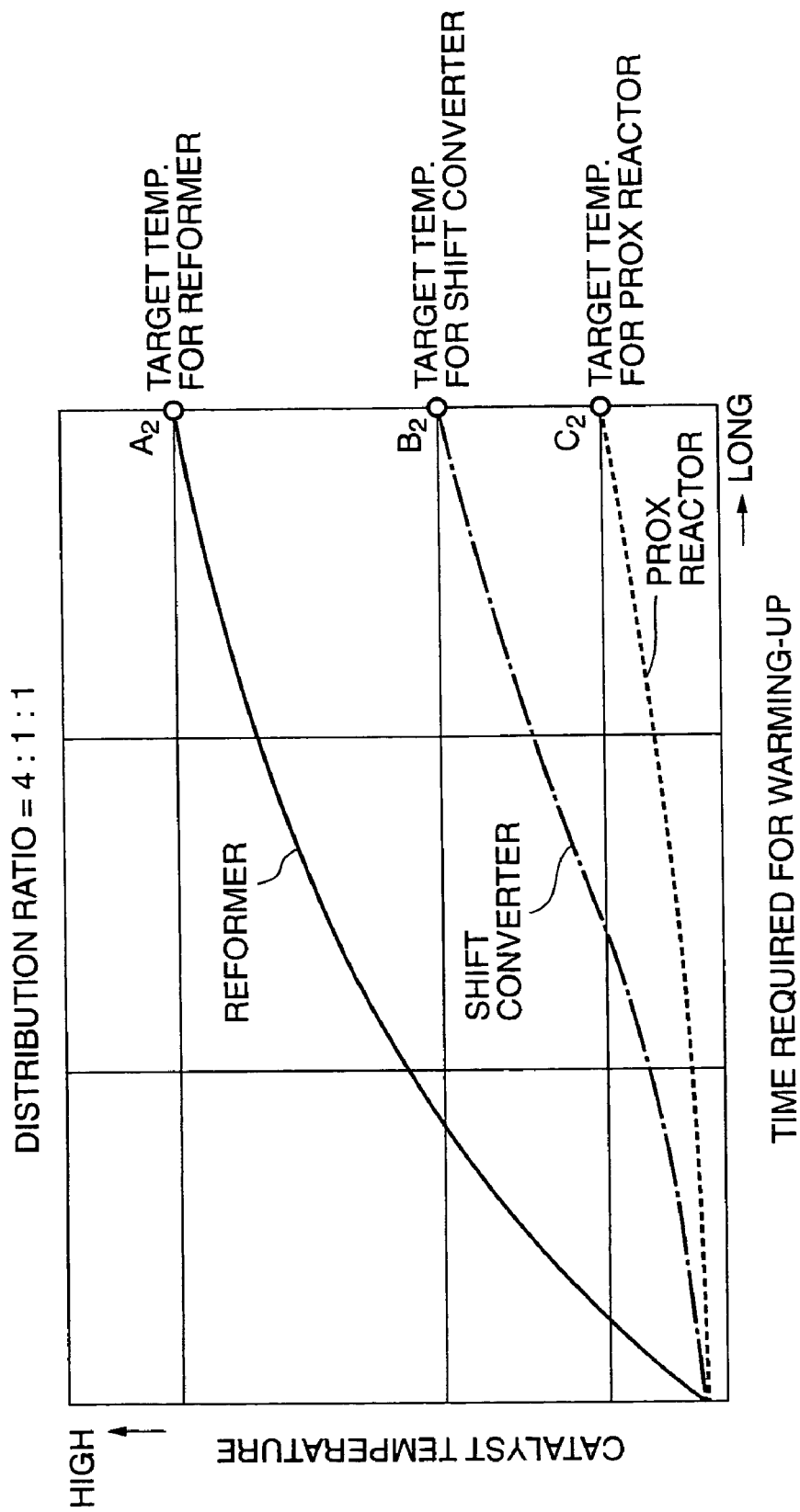
FIG. 5 is a diagram illustrating the relationship between the warm up time and temperature of each reactor when combustion gas is supplied to each reactor in the reforming system.

Changes in the catalyst temperature of the catalytic reactors 3-5 when a warm up device having specifications determined according to the aforementioned procedures performs warm up of the catalytic reactors 3-5 are illustrated in FIG. 5. Here, the distribution ratio Qa:Qb:Qc is set as 4:1:1. Further, changes in the catalyst temperature of the catalytic reactors 3-5 in a similar reforming system when all of the combustion gas produced in the burner 6 is supplied to the reformer 3 alone without distributing it to the shift converter 4 and PROX reactor 5 as described above are illustrated in FIG. 4.

Referring to FIG. 4, when all of the combustion gas is supplied to the reformer 3 alone, the catalyst temperature of the reformer 3 quickly reaches the target temperature, as shown by point $A_1$. However, the combustion gas which is supplied to the shift converter 4 is reduced in temperature following transmission through the reformer 3, and the combustion gas which is supplied to the PROX reactor 5 has an even lower temperature following transmission through the shift converter 4, and as a result, as is shown by point $B_1$ and point $C_1$, a great deal of time is required for the catalyst temperatures of these units 4, 5 to reach their respective target temperatures.

In order to prevent carbon monoxide poisoning of the fuel cell stack 2, carbon monoxide must be removed from the reformate gas produced by the shift converter 4 and PROX reactor 5, but the reforming system cannot supply reformate gas to the fuel cell stack 2 when only the catalyst of the reformer 3 has reached its target temperature. Hence the reforming system may only begin to supply reformate gas to the fuel cell stack 2 at point $C_1$ in the drawing, and thus the time from the beginning of warm up to point $C_1$ becomes the time required for warm up.

Moreover, the reformer 3 and the shift converter 4 are warmed unnecessarily during the interval from point $A_1$ to point $C_1$ and the interval from point $B_1$ to point $C_1$ respectively, with the result that a great deal of fuel is consumed up to the completion of warm up of the reforming system.

Referring to FIG. 5, the warm up device according to this invention directly distributes the combustion gas from the burner 6 to the reformer 3, shift converter 4, and PROX reactor 5 through the combustion gas passages 71-73, and thus, in comparison with FIG. 4, although warm up completion in the reformer 3 is delayed, warm up completion in the PROX reactor 5 is greatly accelerated, as a result of which warm up in the reformer 3, shift converter 4, and PROX reactor 5 ends simultaneously, as is shown by points $A_2$, $B_2$, and $C_2$.

Thus the time required to complete warm up of the reforming system is greatly reduced in comparison with FIG. 4. By completing warm up simultaneously in all of the catalytic reactors 3-5 in this manner, no specific reactor is warmed unnecessarily, and thus little fuel is consumed during warm up.

It should be noted that in the calculation of the aforementioned distribution ratio Qa:Qb:Qc, the initial temperature was set as a fixed value, yet in reality the initial temperature varies according to outside air temperature and so on. However, if the warm up device is designed on the basis of the distribution ratio Qa:Qb:Qc as calculated above, no large deviations occur in the completion timing of warm up of the reformer 3, shift converter 4, and PROX reactor 5 even when the initial temperature differs, and thus warm up time and the amount of energy consumed for warm up can be greatly economized in comparison with the case shown in FIG. 4.

In the above description, the target temperature of each catalytic reactor 3-5 is set with normal fuel cell power plant operation as a reference. However, power plants which are used in combination with a secondary battery such as vehicle fuel cell power plants do not need to perform full power generation immediately after the start of power generation. This is because the power generation deficiency can be compensated for by the supply capability of the secondary battery. In this case, the flow rate of reformate gas required by the fuel cell stack 2 immediately after the start of power generation is low, and thus the required reformate gas flow rate supply can be satisfied as long as a part of each of the catalysts in the catalytic reactors 3-5 has reached the target temperature.

Figure 2:
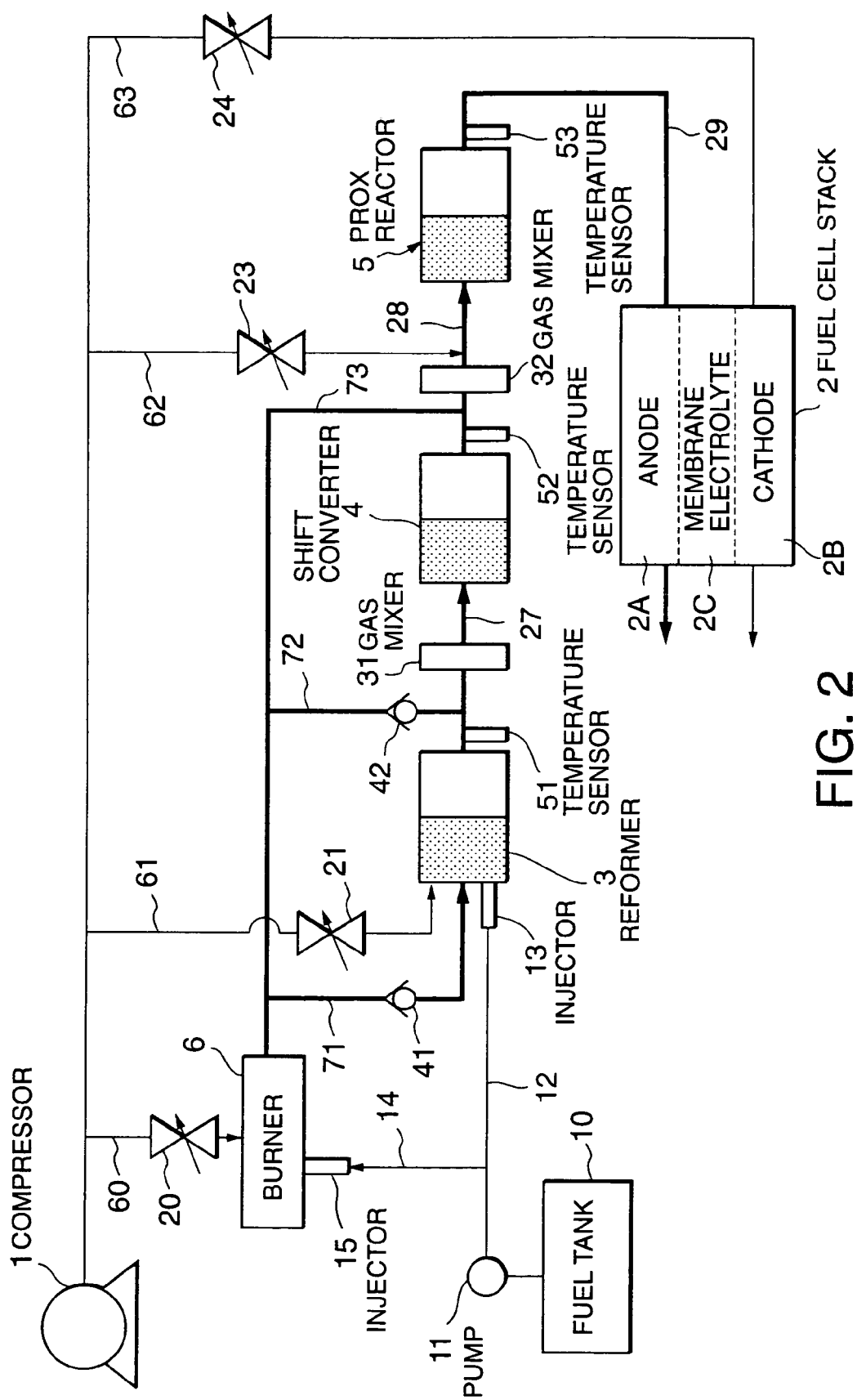
FIG. 2 is similar to FIG. 1, but illustrates warm up of the reforming system when the required output at the time of start up of the fuel cell power plant is smaller than the rated output.

If the load during normal operations is assumed to be 100% and the load immediately after the start of power generation is assumed to be 50%, then as shown in FIG.2 it is adequate for 50% of each catalyst in the catalytic reactors 3-5 to reach its target temperature. Since a catalytic reaction takes place to a certain extent even in the parts of the catalysts which have not reached the target temperature, the actual reformate gas supply capacity can sufficiently satisfy requirements as long as the proportion of catalyst warming is set equally to the required load proportion.

In order to realize this state of partial warm up, the required heat amount calculated in expression (1) is reduced in accordance with the load proportion and the set warm up time Ti is determined on the basis of the reduced required heat amount. The burner 6 then ceases operations upon the elapse of the set warm up time Ti following the start of warm up.

In this state of partial warm up, the temperature at the outlet of each catalytic reactor 3-5 is equal to the temperature prior to warm up, the shift converter 4 is warmed only by the heat of the combustion gas supplied from the combustion gas supply passage 72, and the PROX reactor 5 is warmed only by the heat of the combustion gas supplied from the combustion gas supply passage 73.

In this case, the amount of heat absorbed by each of the catalytic reactors 3-5 is expressed by the following expression (3).

Absorbed heat amount of reformer 3: absorbed heat amount of shift (3)

converter 4: absorbed heat amount of PROX reactor 5 =

(heat amount required for warm up of entire reformer

3·load proportion): (heat amount required for warm up of entire shift coverter 4·load proportion)

: (heat amount required for warm up of entire

PROX reactor 5·load proportion)

In this case also, the combustion gas supply passages 71-73 in the warm up device directly distribute combustion gas from the burner 6 to the catalytic reactors 3-5, and hence it is possible to efficiently warm only the required part of each catalyst, thereby enabling a large reduction in warm up time and the amount of energy consumed for warm up.

In this case, the smaller the required load immediately after the start of power generation in the fuel cell stack 2, the smaller the volume of the warm up subject in each catalytic reactor 3-5. It is therefore efficient to reduce the supply flow rate by heating the combustion gas to as high a temperature as possible without exceeding the heat resistant temperatures of the catalysts.

If the heat resistant temperatures of the catalysts in the reformer 3, the shift converter 4, and the PROX reactor 5 are set as Tr, Ts, and Tc respectively, the relationship Tr>Ts>Tc is generally established. If combustion gas is supplied at a temperature which exceeds the heat resistant temperature, the life of the catalyst is reduced due to the occurrence of sintering and the like, and hence combustion gas can only be supplied to the catalytic reactors 3-5 at a temperature which is equal to or lower than the heat resistant temperatures of the respective catalysts.

In this warm up device, the combustion gas which is supplied to the shift converter 4 or PROX reactor 5 is a mixture of high temperature combustion gas supplied from the combustion gas supply passage 72 or 73 and low temperature combustion gas which has been cooled in the reformer 3 or the shift converter 4, which are positioned upstream, and hence if the temperature Tg of the combustion gas produced by the burner 6 is set in the range Tr>Tg>Tc, the temperature of the combustion gas which is supplied to any of the catalysts in the catalytic reactors 3-5 can be prevented from exceeding the heat resistant temperature thereof.

The temperature sensors 51 to 53 have been inserted into FIGS. 1 and 2 for the sake of descriptive convenience. However, as is made clear by the above description, these temperature sensors 51 to 53 are disposed as experiment equipment for determining the distribution ratio Qa:Qb:Qc, or in other words for obtaining design data regarding the warm up device, and are therefore not constitutional elements of the warm up device.

The combustion gas supply passage 72 may be omitted from the warm up device for the following reason.

The catalyst used in the PROX reactor 5 is generally activated at low temperatures, but has poor durability in respect of high temperatures. It is therefore necessary to sufficiently mix the combustion gas which is supplied to the PROX reactor 5 from the combustion gas supply passage 73 with the combustion gas which flows out from the shift converter 4 in order to reduce the temperature of the combustion gas which flows into the PROX reactor 5 to or below the heat resistant temperature Tc of the catalyst. As a result, a large difference cannot be set between the temperature of the combustion gas which flows into the PROX reactor 5 and the initial temperature, and thus warming of the catalyst in the PROX reactor 5 tends to take time.

The temperature of the combustion gas which flows out from the shift converter 4 into the reformate gas passage 28 increases in accordance with the amount of time elapsed from the beginning of warm up. On the other hand, the temperature of the combustion gas which is supplied to the reformate gas passage 28 from the combustion gas passage 72 is constant. Hence the temperature of the combustion gas which flows into the PROX reactor 5 rises in accordance with the amount of time elapsed t from the beginning of warm up. If the temperature of the combustion gas which flows into the PROX reactor 5 is to be suppressed to or below the heat resistant temperature Tc at the point of warm up completion on the basis of this characteristic, the temperature of the combustion gas which flows into the PROX reactor 5 at the beginning of warm up must be greatly below the heat resistant temperature Tc. However such a temperature characteristic in the combustion gas which flows into the PROX reactor 5 delays heat absorption in the PROX reactor 5, thereby prolonging warming of the catalyst in the PROX reactor 5.

By omitting the combustion gas supply passage 72, the flow rate of the combustion gas which flows out from the shift converter 4 is decreased and the flow rate of the combustion gas in the combustion gas supply passage 73 is increased. As a result, the difference between the temperature of the combustion gas which flows into the PROX reactor 5 at the beginning of warm up and the temperature of the combustion gas which flows into the PROX reactor 5 at the point of warm up completion is reduced. Hence by omitting the combustion gas supply passage 72, the amount of time required to warm up the PROX reactor 5 can be reduced while the temperature of the combustion gas which flows into the PROX reactor 5 is suppressed to or below the heat resistant temperature Tc.

A second embodiment of this invention will now be described with reference to FIGS. 6 and 7.

Figure 6:
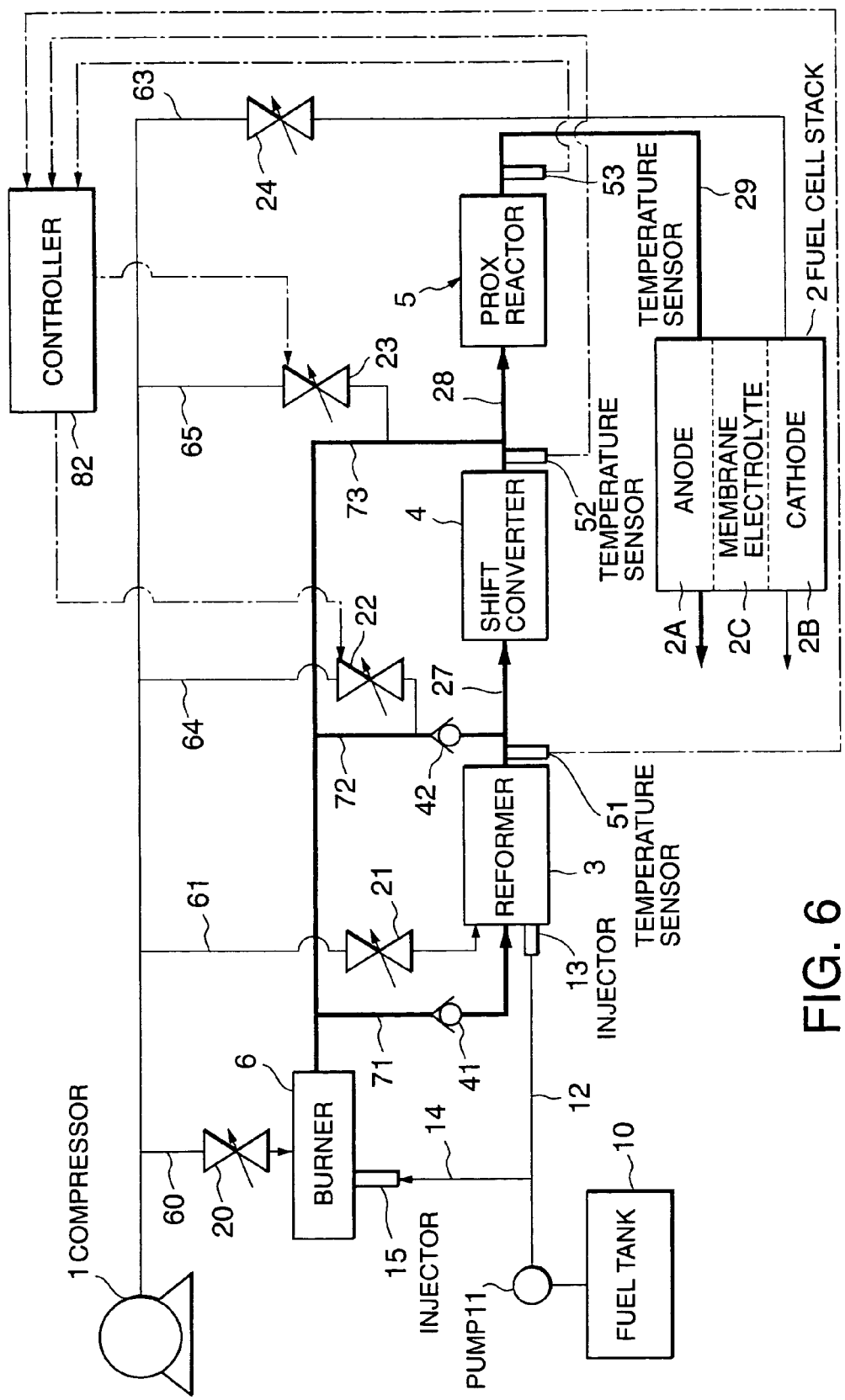
FIG. 6 is similar to FIG. 1 but illustrates a second embodiment of this invention.

Referring to FIG. 6, a warm up device according to this embodiment is further provided with air supply passages 64, 65 and air supply valves 22, 23 in addition to the constitution of the warm up device according to the first embodiment in FIG. 1. Moreover, in the first embodiment the temperature sensors 51-53 were described as experiment equipment for obtaining design data, but in this embodiment the temperature sensors 51-53 are provided as constitutional elements of the warm up device. The warm up device of this embodiment is also provided with a controller 82 for controlling the opening of the air supply valves 22 and 23 during start up of the fuel cell power plant. Meanwhile, the gas mixers 31 and 32 provided in the first embodiment have been omitted from this embodiment.

The air supply passage 64 supplies the combustion gas supply passage 72 with air from the compressor 1 through the air supply valve 22. The air supply passage 65 supplies the combustion gas supply passage 73 with air from the compressor 1 through the air supply valve 23. The temperatures detected by the temperature sensors 51-53 are respectively input into the controller 82 as signals.

The controller 82 is constituted by a microcomputer comprising a central processing unit (CPU), read-only memory (ROM), random access memory (RAM), and an input/output interface (I/O interface). The controller 82 may be constituted by a plurality of microcomputers.

Figure 7:
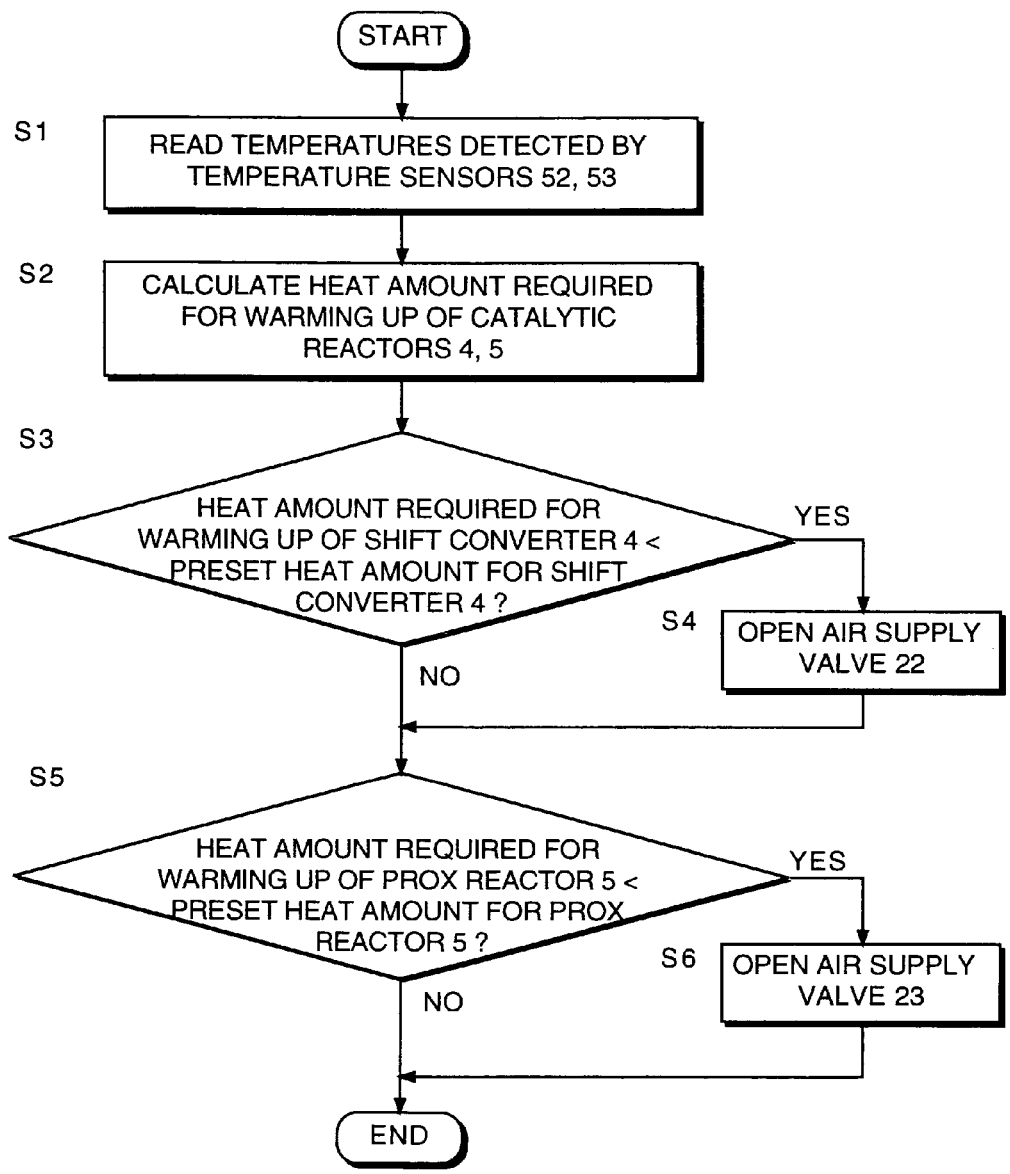
FIG. 7 is a flowchart illustrating an air supply valve control routine which is executed by a controller according to the second embodiment of this invention.

Referring to FIG. 7, a routine for controlling the air supply valves 22 and 23 which is executed upon warming up of the reforming system by the controller 82 will be described. This routine is executed only once, at the starting point of reforming system warm up, or in other words synchronously with start up of the fuel cell power plant.

First, in a step S1, the controller 82 reads from input signals from the temperature sensors 52 and 53 the temperature when the fuel cell power plant is inoperative or the temperature at the start up point. The temperatures detected by the temperature sensors 52 and 53 correspond to the temperature of the outlets of the shift converter 4 and the PROX reactor 5.

Next, in a step S2, the controller 82 calculates from the temperatures detected by the temperature sensors 52 and 53 the initial temperatures of the catalysts in the shift converter 4 and the PROX reactor 5. The relationship between the catalytic reactor outlet temperature and the initial catalyst temperature may be determined experientially. This relationship is stored in the memory of the controller 82 as a map or a mathematical formula, and the controller 82 retrieves the map using the temperatures detected by the temperature sensors 52 and 53 which were read in the step S1 to thereby calculate the initial temperature of the catalyst in the PROX reactor 5. The controller 82 calculates the amount of heat required for warming up the shift converter 4 and PROX reactor 5 from the initial catalyst temperature using expression (1).

Next, in a step S3, the controller 82 compares the heat amount required for warming up the shift converter 4 with a preset heat amount for warming up the shift converter 4. The preset heat amount for warming up the shift converter 4 corresponds to the required heat amount when the shift converter 4 is warmed up from the set initial temperature described in relation to the first embodiment, or in other words to a set warm up heat amount.

If the heat amount required for warming up the shift converter 4 is smaller than the set warm up heat amount, the controller 82 opens the air supply valve 22 in a step S4. Following the processing in the step S4, the controller 82 performs the processing of a step S5.

If, on the other hand, the heat amount required for warming up the shift converter 4 is not smaller than the set warm up heat amount in the step S3, the controller 82 skips the step S4 and performs the processing of the step S5.

In the step S5, the controller 82 compares the heat amount required for warming up the PROX reactor 5 with a preset heat amount for warming up the PROX reactor 5.

If the heat amount required for warming up the PROX reactor 5 is smaller than the set heat amount for warming up the PROX reactor 5, the controller 82 opens the air supply valve 23 in a step S6. Following the processing in the step S6, the controller 82 ends the routine.

If, in the step S5, the heat amount required for warming up the PROX reactor 5 is not smaller than the set heat amount for warming up the PROX reactor 5, the controller 82 immediately ends the routine without performing the processing in the step S6.

Note that in the steps S3 and S5, the heat amounts required for warming up the shift converter 4 and PROX reactor 5, which are calculated in the step S2, are compared with respective set warm up heat amounts. However, rather than comparing heat amounts, the initial temperatures of the shift converter 4 and PROX reactor 5 may be compared with the set initial temperatures used in the calculation of the distribution ratio Qa:Qb:Qc. Accordingly, if the initial temperature of the shift converter 4 is higher than the set initial temperature in the step S3, the air supply valve 22 is opened in the step S4, and if the initial temperature of the PROX reactor 5 is higher than the set initial temperature in the step S5, the air supply valve 23 is opened in the step S6.

In the first embodiment, the flow through cross sections of the combustion gas supply passages 71-73 were set with the set initial temperature as a fixed value, but in actuality the temperature at the starting point of warm up is not constant. The temperatures of the catalytic reactors 3-5 at the starting point of warm up may also differ according to individual cooling conditions such as the disposal around the reactors of apparatus with a large thermal capacity, a large cooling air flow rate, or cooling by a liquid with a large thermal capacity. Such differences in initial temperature lead to differences in the amount of heat required for warm up. In this embodiment, the air supply routine executed by the controller 82 serves to compensate for such differences.

In executing this routine, when the heat amount required for warming up the shift converter 4 which is calculated from the temperature detected by the temperature sensor 52 is smaller than the set warm up heat amount, for example, the air supply valve 22 is opened to supply air from the air supply passage 64 to the combustion gas supply passage 72. By supplying air to the combustion gas supply passage 72, pressure loss in the combustion gas flowing through the combustion gas supply passage 72 increases and the flow rate of the combustion gas decreases.

As a result, the temperature of the gas which is supplied to the shift converter 4 falls and the amount of heat absorbed by the shift converter 4 decreases. On the other hand, a reduction in the combustion gas supply flow rate of the combustion gas supply passage 72 leads to an increase in the combustion gas supply flow rate of the combustion gas supply passages 71 and 73, thereby increasing the amount of heat supplied to the reformer 3 and the PROX reactor 5. As a result, the warm up time of the reformer 3 and the PROX reactor 5 can be shortened.

Further, when the amount of heat required for warming up the PROX reactor 5, calculated from the temperature detected by the temperature sensor 53, is smaller than the set warm up heat amount, the air supply valve 23 is opened to supply air from the air supply passage 65 to the combustion gas supply passage 73. By supplying air to the combustion gas supply passage 73, pressure loss accompanying the flow of combustion gas through the combustion gas supply passage 73 increases and the flow rate of the combustion gas decreases. As a result, the amount of heat supplied to the PROX reactor 5 decreases and the amount of heat supplied to the reformer 3 and the shift converter 4 increases by a commensurate amount.

In order to describe such phenomena, pressure loss in the combustion gas supply passages 71-73 must be considered. Pressure loss in each of the combustion gas supply passages 71-73 has a relationship as shown in the following expression (4).

$$\begin{aligned}\text{Pressure loss in combustion gas supply passage 71} = \\ \text{pressure loss in combustion gas supply passage 72} - \\ \text{pressure loss in reformer 3} = \\ \text{pressure loss in combustion gas supply passage 73} - \\ (\text{pressure loss in reformer 3} + \text{pressure loss in shift converter 4})\end{aligned} \quad (4)$$

If the combustion gas supply passages 71-73 are regarded as pipe bodies, each pressure loss in expression (4) can be calculated according to the following expression (5).

$$\text{Pressure loss} = \tag{5}$$
$$\text{pressure loss coefficient} \cdot (\text{pipe extension}/\text{pipe diameter}) \cdot \text{gas density} \cdot \{(\text{gas flow velocity})^2/2\}$$

A logical value or an experiential value may be applied to the pressure loss coefficient of the catalytic reactors 3-5 and the combustion gas supply passages 71-73.

The flowchart in FIG. 7 illustrates the most basic control of the air supply valves 22 and 23, but if the opening of the air supply valves 21 to 23 is further controlled such that the pressure loss in each of the catalytic reactors 3-5 and the combustion gas supply passages 71-73 determined according to expression (5) satisfy the relationship in expression (4), the timing of warm up completion in the catalytic reactors 3-5 can be aligned at all times regardless of the initial temperature of the catalysts in the catalytic reactors 3-5.

A case in which the PROX reactor 5 requires no warming whatsoever, or in other words when the catalyst of the PROX reactor 5 has already reached operating temperature, can be considered as an example. In this case, in order that the temperature of the gas which is supplied to the reformate gas passage 28 from the combustion gas supply passage 73 becomes equal to the operating temperature of the PROX reactor 5, the controller 82 sets the supply flow rate of the air which is supplied to the reformate gas passage 28 from the air supply passage 65 and controls the air supply valve 23 to a corresponding degree of opening.

As a result of supplying air to the combustion gas supply passage 73, pressure loss in the combustion gas in the combustion gas supply passage 73 increases, whereby the flow rate of combustion gas supplied to the reformer 3 and shift converter 4 rises. Further, since the temperature of the gas flowing into the PROX reactor 5 falls to the vicinity of the operating temperature, the catalyst temperature of the PROX reactor 5 is maintained at the operating temperature.

Further, when the temperature of the gas flowing into the shift converter 4 threatens to exceed the heat resistant temperature Ts of the catalyst in the shift converter 4, the controller 82 manipulates the air supply valve 22 to increase the flow rate of the air which is supplied to the combustion gas supply passage 72 from the air supply passage 64, whereby the temperature of the gas flowing into the shift converter 4 can be reduced. Similarly, when the temperature of the gas flowing into the PROX reactor 5 threatens to exceed the heat resistant temperature Tc of the catalyst in the PROX reactor 5, the controller 82 manipulates the air supply valve 23 to increase the flow rate of the air which is supplied to the combustion gas supply passage 73 from the air supply passage 65, whereby the temperature of the gas flowing into the PROX reactor 5 can be reduced. The temperature Tg of the combustion gas produced by the burner 6 can be set accordingly to a value close to the heat resistant temperature Tr of the reformer 3.

When the amount of heat supplied to the catalytic reactors 3-5 is controlled by means of the air supply amount, the temperature of the gas which flows into the shift converter 4 can be suppressed to or below the heat resistant temperature Ts even when gas mixing is not performed sufficiently at the point of convergence between the combustion gas supply passage 72 and the reformate gas passage 27. Similarly, the temperature of the gas which flows into the PROX reactor 5 can be suppressed to or below the heat resistant temperature Tc even when gas mixing is not performed sufficiently at the point of convergence between the combustion gas supply passage 73 and the reformate gas passage 28. Hence the omission of the gas mixers 31 and 32 in this embodiment.

Next, referring to FIGS. 8 and 9, a third embodiment of this invention will be described.

Figure 8:
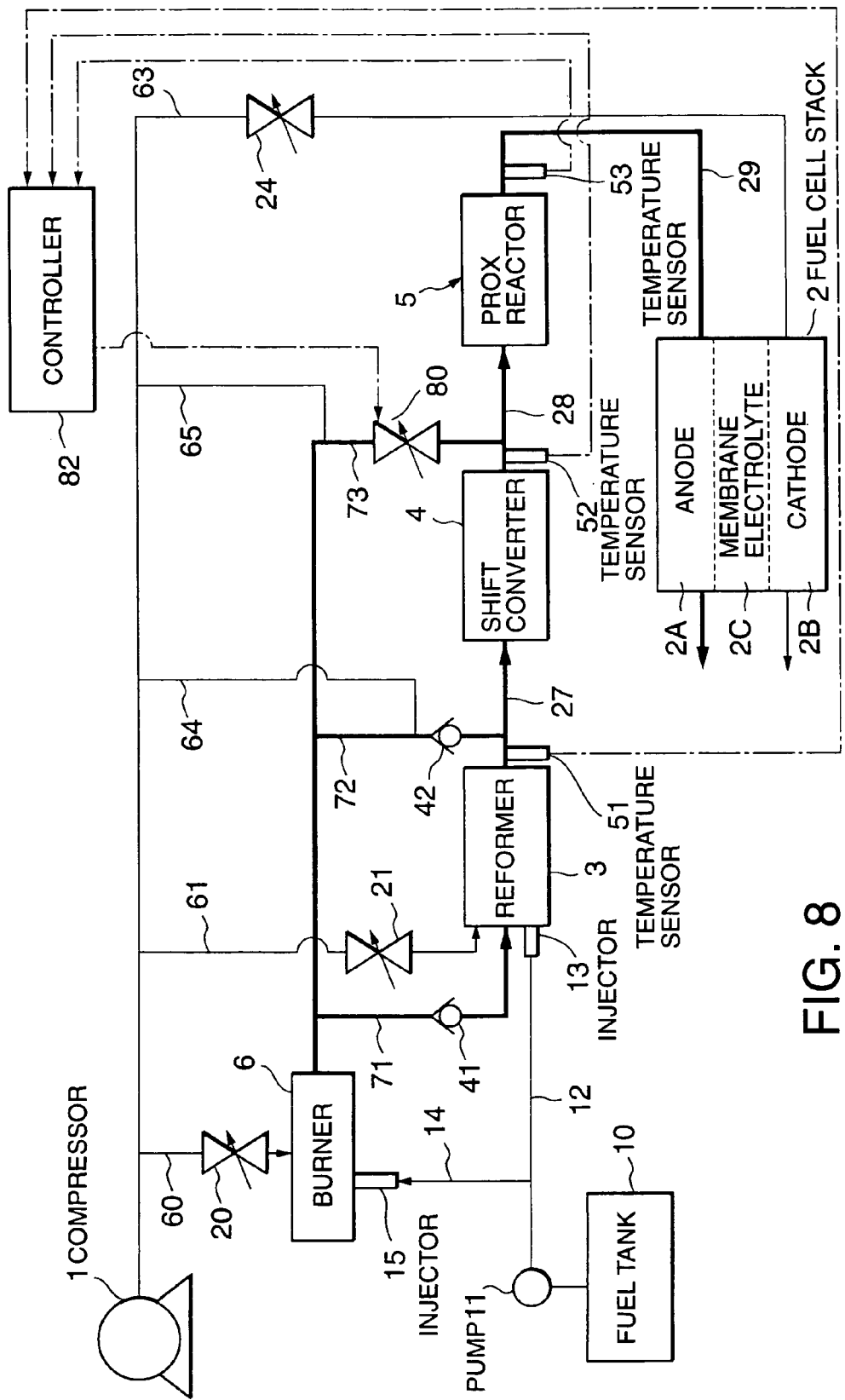
FIG. 8 is similar to FIG. 1 but illustrates a third embodiment of this invention.

Referring to FIG. 8, a warm up device according to this embodiment is provided with a flow control valve 80 in the combustion gas supply passage 73 in place of the air supply valves 22 and 23 of the second embodiment.

In the second embodiment, the flow rate of the combustion gas which is supplied to the catalytic reactors 3-5 was altered by means of air supply from the air supply valves 22 and 23, but in this embodiment the flow rate of the combustion gas which is supplied to the PROX reactor 5 is altered by manipulating the flow control valve 80.

During the start up period of the reforming system, air is supplied through the air supply passage 64 to the combustion gas supply passage 72 at all times. Similarly, air is supplied through the air supply passage 65 to the combustion gas supply passage 73 at all times. The flow control valve 80 is provided downstream of the point of convergence between the combustion gas supply passage 73 and the air supply passage 65.

In this embodiment, set warm up heat amounts Ha0, Hb0, Hc0 for each of the catalytic reactors 3-5 are calculated in advance using expression (1) with the initial temperatures of the catalytic reactors 3-5 as fixed values, and the flow through cross sections of the combustion gas passages 71-73 are determined on the basis of the result thereof and the flow rate of the air supplied from the air supply passages 64 and 65. A degree of opening of the flow control valve 80 which corresponds to the flow through cross section of the combustion gas passage 73 is then set as the initial opening of the flow control valve 80.

Figure 9:
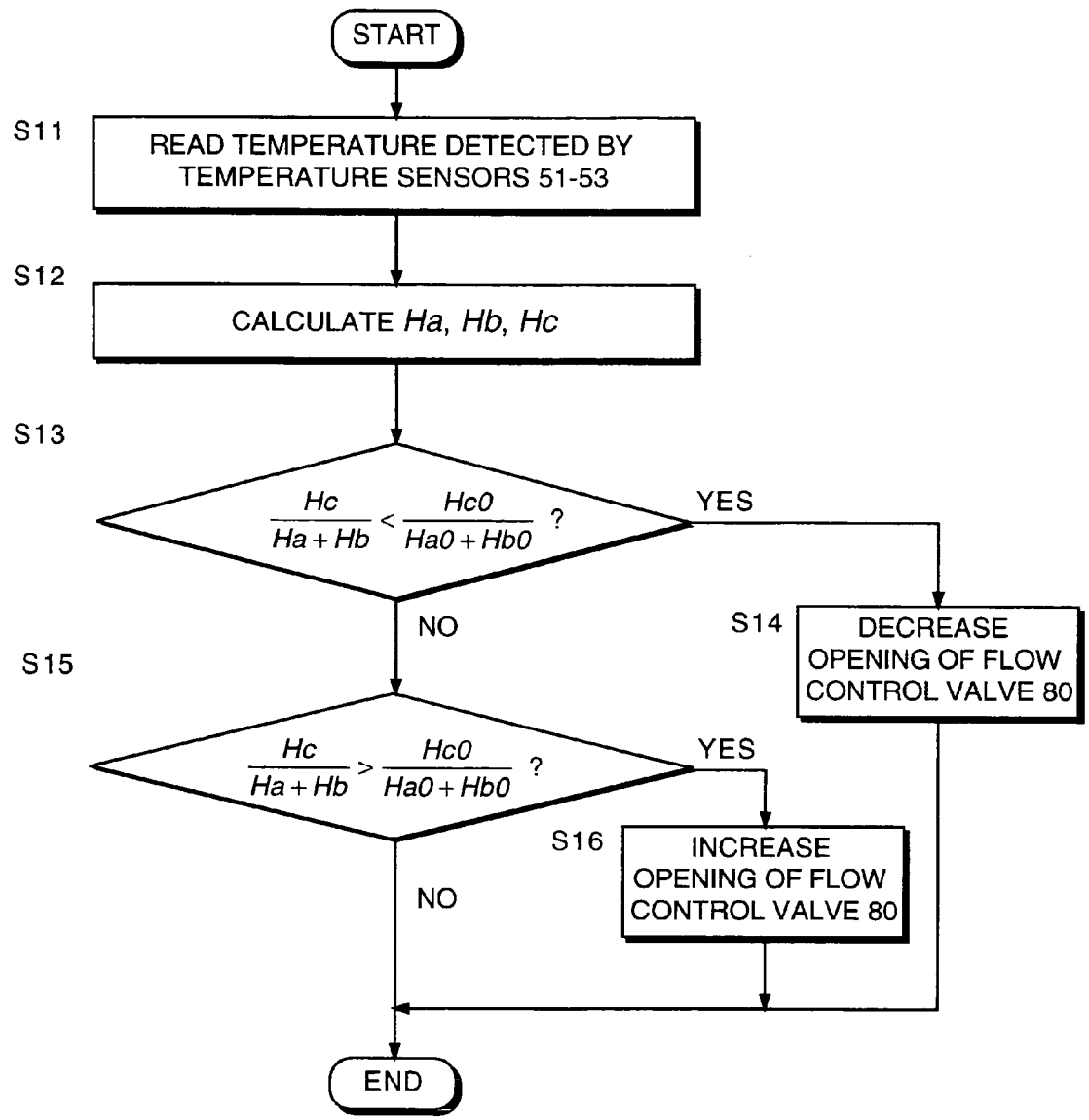
FIG. 9 is a flowchart illustrating a flow control valve control routine which is executed by a controller according to the third embodiment of this invention.

Referring next to FIG. 9, a flow control valve control routine which is executed by the controller 82 to control warm up of the catalytic reactors 3-5 will be described. This routine is also executed only once at the beginning of warm up of the reforming system.

First, in a step S11, the controller 82 reads the temperatures detected by the temperature sensors 51-53.

Next, in a step S12, a similar map to that in the step S2 in the routine in FIG. 7 according to the second embodiment is referred to calculate the initial temperature of the catalysts in the catalytic reactors 3-5. The obtained initial temperatures are then substituted into expression (1) to respectively calculate the heat amounts Ha, Hb, Hc required for warming up the catalysts in the catalytic reactors 3-5.

Next, in a step S13, a judgment is made as to whether or not Hc/(Ha+Hb) is smaller than a preset value Hc0/(Ha0+Hb0). Here, Hc/(Ha+Hb) expresses the ratio of the heat amount required for warming up the PROX reactor 5 and the total heat amount required for warming up the other catalytic reactors 3, 4. Hc0/(Ha0+Hb0) is a fixed value based on the set warm up heat amount. If Hc/(Ha+Hb) is smaller than Hc0/(Ha0+Hb0), the controller 82 reduces the opening of the flow control valve 80 from the initial opening in a step S14. After performing the processing in the step S14, the controller 82 ends the routine.

If, on the other hand, Hc/(Ha+Hb) is not smaller than Hc0/(Ha0+Hb0), the controller 82 determines whether or not Hc/(Ha+Hb) is larger than Hc0/(Ha0+Hb0) in a step S15. If Hc/(Ha+Hb) is larger than Hc0/(Ha0+Hb0), the opening of the flow control valve 80 is increased from the initial opening in a step S16. Following the processing in the step S16, the controller 82 ends the routine.

If, in the step S15, Hc/(Ha+Hb) is not larger than Hc0/(Ha0+Hb0), the controller 82 ends the routine without altering the opening of the flow control valve 80 from the initial opening.

By decreasing the opening of the flow control valve 80 from the initial opening, pressure loss in the combustion gas supplied to the PROX reactor 5 increases. As a result, the flow rate of the combustion gas supplied to the PROX reactor 5 decreases and the amount of heat supplied to the PROX reactor 5 also decreases. Meanwhile, the amount of heat supplied to the reformer 3 and shift converter 4 increases. Conversely, by increasing the opening of the flow control valve 80 from the initial opening, pressure loss in the combustion gas supplied to the PROX reactor 5 decreases. As a result, the flow rate of the combustion gas supplied to the PROX reactor 5 increases and the amount of heat supplied to the PROX reactor 5 also increases. Meanwhile, the amount of heat supplied to the reformer 3 and shift converter 4 decreases.

Thus the ratio Hc/(Ha+Hb) between the amount of heat supplied to the PROX reactor 5 and the amount of heat supplied to the other catalytic reactors 3, 4 changes in accordance with increases and decreases in the opening of the flow control valve 80.

As noted above, the operating temperatures of the catalytic reactors 3-5 increase the further upstream the reactor is positioned. Accordingly, the amount of heat radiation immediately after operations are halted increases the further upstream the catalytic reactor is positioned. The amount of heat radiation decreases rapidly as the difference between the peripheral atmospheric temperature and the catalyst temperature grows smaller.

The amount of heat required to warm up the catalytic reactors 3-5 when the reactors are restarted is proportionate to the amount of heat radiation. Accordingly, the value of Hc/(Ha+Hb) when the catalytic reactors 3-5 are warmed up from an initial temperature which is higher than the set initial temperature is smaller than Hc0/(Ha0+Hb0) when the catalytic reactors 3-5 are warmed up from the set initial temperature. In other words, the amount of heat supplied to the reformer 3 and the shift converter 4 must be increased relative to increases in the initial temperature.

According to this routine, the opening of the flow control valve 80 is increased and decreased in accordance with a comparison of the heat amount ratio Hc/(Ha+Hb) based on the actual initial temperature and the heat amount ratio Hc0/(Ha0+Hb0) based on the set warm up heat amount, and thus the catalytic reactors 3-5 are warmed up efficiently regardless of the initial temperature, thereby enabling a reduction in the amount of time required for warming up the reforming system.

Further, by determining the rate of increase and decrease in the opening of the flow control valve 80 in accordance with the heat amount ratio Hc/(Ha+Hb) based on the actual initial temperature and the heat amount ratio Hc0/(Ha0+Hb0) based on the set warm up heat amount, the heat amounts supplied to the catalytic reactors 3-5 can be distributed with a higher degree of precision.

An air supply valve 22 similar to that of the second embodiment may be provided in the air supply passage 64.

The contents of Tokugan 2002-106235, with a filing date of Apr. 9, 2002 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, in each of the above embodiments, the subjects of warm up are the reformer 3, shift converter 4, and PROX reactor 5 which constitute the reforming system, but the fuel cell stack 2, in which the anode 2A and cathode 2B are provided with a catalyst, is also a type of catalytic reactor. Accordingly, this invention is also applicable to a case in which the reformer 3 and fuel cell stack 2 are warmed up by combustion gas from the burner 6.

INDUSTRIAL FIELD OF APPLICATION

As described above, in this invention combustion gas is distributed individually to a plurality of catalytic reactors, thereby eliminating differences in the timing of catalytic reactor warm up completion and reducing the amount of time required for warming up a fuel cell power plant. Hence this invention produces a particularly favorable effect when applied to a fuel cell power plant for installation in a vehicle which is operated and halted frequently.

The embodiments of this invention in which an exclusive property or privilege is claimed are defined as follows:

The invention claimed is:

1. A warm up device for a catalytic reactor for use with a fuel cell power plant which comprises a plurality of catalytic reactors each of which contains a catalyst, and a gas passage for connecting the catalytic reactors in series, the warm up device comprising:
   a burner for producing combustion gas by burning fuel in order to warm the catalysts upon start up of the fuel cell power plant, the burner comprising a lean burn burner for burning a mixture of fuel and air at a larger air-fuel ratio than a stoichiometric air-fuel ratio;
   combustion gas supply passages for distributing the combustion gas individually to the catalytic reactors; and
   a heat amount supply adjustment mechanism for reducing differences among the reactors in relation to a timing at which the catalyst reaches an activation temperature, the heat amount supply adjustment mechanism comprising a valve which is capable of supplying air to one of the combustion gas supply passages.

2. The warm up device as defined in claim 1, wherein the warm up device further comprises a sensor for detecting a catalyst temperature of a specific catalytic reactor which is connected to the one of the combustion gas supply passages and a controller functioning to:
   calculate from the catalyst temperature detected prior to combustion gas distribution an amount of heat required to warm the catalyst to activation temperature;
   compare the heat amount with a preset design warm up heat amount; and
   control the valve such that air is supplied to the specific catalytic reactor when the heat amount is smaller than the design warm up heat amount.

3. The warm up device as defined in claim 1, wherein the heat amount supply adjustment mechanism comprises a valve which is capable of increasing and decreasing a combustion gas flow rate in one of the combustion gas supply passages.

4. The warm up device as defined in claim 3, wherein the warm up device further comprises a sensor for detecting the catalyst temperature of each of the catalytic reactors, and a controller functioning to: calculate from the catalyst temperature of each of the catalytic reactors detected prior to combustion gas distribution an amount of heat required to warm the catalyst in each of the catalytic reactors to the activation temperature, compare a heat amount ratio of the amount of heat required to warm up the catalyst in a catalytic reactor which is supplied with combustion gas through the valve and the amount of heat required to warm up the catalyst in a different catalytic reactor with a preset design heat amount ratio, and control the valve to cause the combustion gas flow rate to decrease when the heat amount ratio is smaller than the preset design heat amount ratio.

5. The warm up device as defined in claim 4, wherein the controller further functions to control the valve to cause the combustion gas flow rate to increase when the heat amount ratio is larger than the design heat amount ratio.

6. The warm up device as defined in claim 1, wherein the catalytic reactors comprise a reformer for reforming fuel to produce reformate gas containing hydrogen and carbon monoxide, a shift converter for reducing by shift conversion the carbon monoxide concentration in the reformate gas which flows therein from the reformer through the gas passage, and a preferential oxidation reactor for reducing by a preferential oxidation reaction the carbon monoxide concentration in the reformate gas which flows therein from the shift converter through the gas passage, and the combustion gas supply passages comprise a combustion gas passage for distributing combustion gas to the reformer and a combustion gas passage for distributing combustion gas to the preferential oxidation reactor.

7. The warm up device as defined in claim 1, wherein the power plant upon start up is operated with a start up load which is smaller than a load during normal operation, and the warm up device is arranged to warm up the catalyst of each of the catalytic reactors for a limited time corresponding to a proportion of the start up load and the load during normal operation.

* * * * *